(12) United States Patent
Yu et al.

(10) Patent No.: US 9,923,190 B2
(45) Date of Patent: Mar. 20, 2018

(54) METHOD FOR PREPARING POSITIVE ELECTRODE ACTIVE MATERIAL PRECURSOR AND POSITIVE ELECTRODE MATERIAL FOR LITHIUM SECONDARY BATTERY HAVING CONCENTRATION-GRADIENT LAYER USING BATCH REACTOR, AND POSITIVE ELECTRODE ACTIVE MATERIAL PRECURSOR AND POSITIVE ELECTRODE MATERIAL FOR LITHIUM SECONDARY BATTERY PREPARED BY THE METHOD

(75) Inventors: Jong-Ryeol Yu, Bucheon-si (KR); Moon-Ho Choi, Chungbuk (KR)

(73) Assignee: ECOPRO BM CO., LTD., Cheongju-si, Chungcheongbuk-Do (KR)

( * ) Notice: Subject to any disclaimer, the term of this patent is extended or adjusted under 35 U.S.C. 154(b) by 1101 days.

(21) Appl. No.: 13/521,974

(22) PCT Filed: Jan. 14, 2011

(86) PCT No.: PCT/KR2011/000278
§ 371 (c)(1),
(2), (4) Date: Jul. 12, 2012

(87) PCT Pub. No.: WO2011/087309
PCT Pub. Date: Jul. 21, 2011

(65) Prior Publication Data
US 2013/0202966 A1    Aug. 8, 2013

(30) Foreign Application Priority Data
Jan. 14, 2010 (KR) .................. 10-2010-0003580

(51) Int. Cl.
*H01M 4/131* (2010.01)
*H01M 10/052* (2010.01)
(Continued)

(52) U.S. Cl.
CPC .......... *H01M 4/131* (2013.01); *C01G 53/006* (2013.01); *C01G 53/50* (2013.01); *H01M 4/1391* (2013.01);
(Continued)

(58) Field of Classification Search
CPC .................... H01M 4/366; H01M 4/50–4/525
See application file for complete search history.

(56) References Cited

U.S. PATENT DOCUMENTS

2006/0188780 A1* 8/2006 Fujii .................. C01G 45/1228
429/223
2012/0080649 A1* 4/2012 Koenig, Jr. .......... C01G 53/006
252/519.2

FOREIGN PATENT DOCUMENTS

KR    10-0752703 B1    8/2007
KR    10-0822012 B1    4/2008

OTHER PUBLICATIONS

KR 100752703 B1 Machine Translation provided by EPO, dated Aug. 29, 2007, retrieved Jun. 1, 2015.*
(Continued)

Primary Examiner — Barbara L Gilliam
Assistant Examiner — Robert S Carrico
(74) Attorney, Agent, or Firm — Lucas & Mercanti, LLP

(57) ABSTRACT

The present invention relates to a method for preparing a positive electrode active material precursor and a positive electrode material for a lithium secondary battery having a concentration-gradient layer using a batch reactor, and to a positive electrode active material precursor and a positive electrode material for a lithium secondary battery prepared by the method. The method for preparing a positive electrode active material precursor and a positive electrode active material for a lithium secondary battery having a concentration-gradient layer using a batch reactor involves supplying a predetermined amount of a chelating agent into
(Continued)

the batch reactor, and simultaneously supplying transition metals while continuously adjusting the concentration of the transition metals such that the concentration-gradient layer can be formed from a core to a shell of the positive electrode active material in a more economically advantageous and stable manner, and at the same time a positive electrode active material having an elongated lifespan and improved thermal stability can be provided.

6 Claims, 10 Drawing Sheets

(51) Int. Cl.
  *H01M 4/525* (2010.01)
  *H01M 4/505* (2010.01)
  *H01M 4/1391* (2010.01)
  *C01G 53/00* (2006.01)

(52) U.S. Cl.
  CPC ............ *H01M 4/505* (2013.01); *H01M 4/525* (2013.01); *H01M 10/052* (2013.01); *C01P 2002/72* (2013.01); *C01P 2002/74* (2013.01); *C01P 2002/76* (2013.01); *C01P 2002/85* (2013.01); *C01P 2004/03* (2013.01); *C01P 2004/32* (2013.01); *C01P 2004/51* (2013.01); *C01P 2006/11* (2013.01)

(56) References Cited

OTHER PUBLICATIONS

PCT International Search Report dated Oct. 20, 2011 issued in a related PCT International Application No. PCT/KR2011/000278 (2 pages).

\* cited by examiner

| No. | Mol% | | |
|---|---|---|---|
| | Ni | Co | Mn |
| 1 | 57.3 | 11.9 | 30.8 |
| 2 | 57.8 | 10.2 | 31.9 |
| 3 | 56.4 | 11.5 | 32.0 |
| 4 | 55.8 | 10.8 | 33.4 |
| 5 | 53.6 | 11.2 | 35.2 |

| No. | Mol% | | |
|---|---|---|---|
| | Ni | Co | Mn |
| 1 | 64.5 | 10.8 | 24.7 |
| 2 | 58.9 | 9.9 | 31.2 |
| 3 | 49.9 | 10.0 | 41.1 |
| 4 | 48.5 | 10.8 | 40.7 |
| 5 | 40.5 | 10.5 | 49.0 |

…

METHOD FOR PREPARING POSITIVE ELECTRODE ACTIVE MATERIAL PRECURSOR AND POSITIVE ELECTRODE MATERIAL FOR LITHIUM SECONDARY BATTERY HAVING CONCENTRATION-GRADIENT LAYER USING BATCH REACTOR, AND POSITIVE ELECTRODE ACTIVE MATERIAL PRECURSOR AND POSITIVE ELECTRODE MATERIAL FOR LITHIUM SECONDARY BATTERY PREPARED BY THE METHOD

CROSS-REFERENCE TO RELATED APPLICATIONS

This application is a 371 of PCT/KR2011/000278 filed on Jan. 14, 2011, which claims the benefit of Korean Patent Application No. 10-2010-0003580 filed on Jan. 14, 2010, the entire contents of each of which are incorporated herein by reference.

FIELD OF THE INVENTION

This application is based upon and claims the benefit of priority from Korean Patent Applications No. 10-2010-0003580, filed on Jan. 14, 2010, the entire content of which is incorporated herein by reference.

The present invention relates to a method for preparing a positive electrode active material precursor and a positive electrode material for a lithium secondary battery having a concentration-gradient layer using a batch reactor, and to a positive electrode active material precursor and a positive electrode material for a lithium secondary battery prepared by the method.

BACKGROUND OF THE INVENTION

Recently, interest in energy storage technology is rising. As its application is spreading into mobile phones, camcorders, notebook computers, PCs and electric vehicles, research and development therefor are being intensive more and more. In this regard, electrochemical devices are the most highlighted field, and particularly, development of rechargeable secondary batteries is being the focus of attention.

Among the currently used secondary batteries, a lithium secondary battery, developed in early 1990's, is a compact, light-weight and high capacity battery, and has been widely used as a power source of portable devices since its appearance in 1991's. The lithium secondary battery is being highlighted due to its higher drive voltage and energy density than those of conventional batteries using aqueous electrolytes (such as Ni-MH batteries, Ni—Cd batteries and Pb-sulfuric acid batteries). Particularly, researches about a power source for an electric vehicle, wherein an internal-combustion engine and a lithium secondary battery are hybridized, are actively proceeding in America, Japan, Europe and the like.

However, in view of energy density, the use of a lithium ion battery as a large battery for an electric vehicle has been considered, but in view of stability, a Ni-MH battery has been being used so far. In the lithium ion battery for an electric vehicle, the biggest challenge is high cost and safety. Particularly, if an over-charged battery is heated at 200 to 270° C., the structure of the commercially used positive electrode active materials such as $LiCoO_2$ and $LiNiO_2$ are rapidly changed. And, due to its structural change, the crystal structure becomes instable by the reaction releasing oxygen in a lattice, and delithiation during charging, and therefore, thermal stability also becomes very poor.

For improving this, various methods, for example, a method substituting a part of Ni (nickel) into a transition metal to shift the temperature of heat generation to a little higher temperature or to inhibit rapid heat generation are being attempted. A material substituting a part of Ni into Co (cobalt), i.e., $LiNi_{1-x}Co_xO_2$ (x=0.1-0.3), showed excellent charging/discharging characteristics and lifespan, but did not solve the stability problem. Further, Li—Ni—Mn-based composite oxide, wherein a part of Ni is substituted with Mn having excellent thermal stability, or Li—Ni—Mn—Co-based composite oxide, wherein a part of Ni is substituted with Mn and Co, and technologies for preparing thereof are well known. Further, Japanese Patent No. 2000-227858 disclosed a positive electrode active material prepared by not the technology partly substituting transition metal to $LiNiO_2$ or $LiMnO_2$, but a novel technology uniformly distributing Mn and Ni compounds in atomic level to obtain a solid solution.

According to European Patent No. 0918041 or U.S. Pat. No. 6,040,090 about compositions of Li—Ni—Mn—Co-based composite oxide, wherein Ni is substituted with Mn and Co, $LiNi_{1-x}Co_xMn_yO_2$ (0<y≤0.3) showed better thermal stability than the existing material comprising only Ni and Co, but it could not solve the problem of thermal stability of the Ni-based compound yet.

In order to solve the problem, methods changing the surface composition of the positive electrode active material adjacent to electrolyte are applied, and one of these methods is a surface-coating method. Generally, it is known that the amount of coating is very small of 1 to 2% by weight or less based on a positive electrode active material, and the coating layer forms a very thin membrane layer of about several nanometers to prevent side reaction with electrolyte. Or, sometimes, when the heat-treating temperature after coating is too high, a solid solution is formed on the surface of the powder particles and the metal composition is different with the composition inside the particle. In this case, the thickness of the surface layer bound to the coating material is several nanometers or less, and there is a dramatic difference between the coating layer and the particle bulk. Therefore, after long-term use of hundreds of cycles, the effect becomes lower. Further, the effect is behalved by incomplete coating, namely, nonuniform distribution of the coating layer on the surface.

In order to solve the problem, Korean Patent Application No. 10-2005-7007548 disclosed a lithium transition metal oxide having the concentration-gradient of metal. This method could synthesize an internal layer and an external layer with different metal composition, but the metal composition was not gradually and continuously changed in the synthesized positive electrode active material. Through a heat-treating process, gradual concentration-gradient of the metal composition could be obtained, but difference in the concentration-gradient was hardly formed at high heat-treating temperature of 850° C. or more due to thermal diffusion of metal ions. Further, the powder synthesized by this invention had low tapped density because the powder did not used ammonia as a chelating agent. Therefore, it was not enough to be used as a positive electrode active material for a lithium secondary battery. Further, in this method, when the lithium transition metal oxide was used as an internal material, reproducibility was reduced due to difficulty in controlling the amount of lithium on the outer layer.

Korean Patent Application No. 10-2004-0118280 suggested a bi-layer structure having a core-shell structure. This patent disclosed a material having high capacity and excellent thermal stability prepared by: combining a positive electrode composition having high capacity to a core; and a positive electrode composition having excellent thermal stability to an outer shell, by using a CSTR (Continuous Stirring Tank Reactor). However, it was difficult to form a layer having continuous concentration distribution between two interfaces, where the internal core and the outer shell meet, due to diffusion of metal elements on the interfaces. Namely, an excellent positive electrode active material, which satisfies both high efficiency and lifespan, could not be obtained.

In order to solve the problems, Korean Patent Application No. 10-2006-0059784 suggested a structure having continuous concentration-gradient of the metal composition from the contacting interface of an inner core and an outer bulk unit to the contacting interface of the outer bulk unit and an outer shell. The positive electrode active material having the said structure could satisfy both high efficiency and lifespan, but mass production of the positive electrode active material having the said structure was difficult. In this patent, a positive electrode active material having the said structure was generally prepared using a CSTR due to easy adjustment of compositional ratio. In case of the CSTR, the temperature, concentration and residence time of all reactants in the reactor were same. However, practically, there was difference of reacting condition such as temperature and concentration of each part in the reactor in an initial step supplying reactants, and until the reacting condition such as temperature and concentration in the reactor becomes same, i.e., theoretical state, all raw materials used as the initial reactant and initial product were discarded, and consequently, the yield of the product compared with the supplied raw material was low. Further, when a positive electrode active material precursor and a positive electrode active material were prepared using the conventional CSTR, supplying the raw material and discharging the product were simultaneously conducted continuously, there could be a variation between the residence time and the reaction time in the reactor of the positive electrode active material precursor and the positive electrode active material produced in the reactor, and consequently, there was a problem of non-uniformity in the size and constituent of the produced particle.

SUMMARY OF THE INVENTION

Therefore, the present invention has been made in view of the above problems, and it is an object of the present invention to provide a method for preparing a positive electrode active material precursor and a positive electrode active material, which have high capacity and tapped density and excellent lifespan and thermal stability, using a batch reactor by co-precipitation method, wherein the positive electrode active material precursor and the positive electrode active material comprises: a core layer made up of a Ni—Co—Mn-based positive electrode having high capacity; a concentration-gradient where the relative concentrations of Ni, Co and Mn are gradually changed; and a shell layer.

Further, it is another object of the present invention to provide a positive electrode active material precursor and a positive electrode material, which comprises the core layer, the concentration-gradient layer and the shell layer, prepared by the said method.

Further, it is another object of the present invention to provide a lithium secondary battery comprising the positive electrode active material precursor and the positive electrode active material having a concentration-gradient layer prepared according to the said method.

Hereinafter, the method according to the present invention for preparing a positive electrode active material precursor for a lithium secondary battery, which comprises: a core layer made up of a Ni—Co—Mn-based compound having high capacity; a shell layer made up of a Ni—Co—Mn-based compound having stability; and a concentration-gradient layer, where the relative concentrations of Ni, Co and Mn are gradually changed between the core layer and the shell layer, using a batch reactor by co-precipitation method will be described in detail.

The method of the present invention for preparing a positive electrode active material precursor for a lithium secondary battery having a core, a shell and a concentration-gradient layer using a batch reactor comprises:

1) supplying a chelating agent aqueous solution into the batch reactor;

2) simultaneously supplying a first precursor aqueous solution, a chelating agent aqueous solution and a basic aqueous solution into the reactor continuously to obtain a spherical precipitate forming a core layer;

3) simultaneously supplying a second precursor aqueous solution, a chelating agent aqueous solution and a basic aqueous solution into the reactor continuously to obtain a precipitate forming a concentration-gradient layer, where the concentrations of Ni, Mn and Co are relatively gradually changed, on the surface of the core layer;

4) simultaneously supplying a third precursor aqueous solution, a chelating agent aqueous solution and a basic aqueous solution into the reactor continuously to obtain a precipitate forming a shell layer on the surface of the concentration-gradient layer; and 5) drying or heat-treating the precipitate to prepare a positive electrode active material precursor for a lithium secondary battery.

The positive electrode active material precursor for a lithium secondary battery prepared by the said method comprises a core layer of $[Ni_aCo_bMn_{1-(a+b)}]O_2$ ($0.7 \leq a \leq 0.9$, $0 \leq b \leq 0.2$), a shell layer of $[Ni_aCo_bMn_{1-(a+b)}]O_2$ ($0 \leq a \leq 0.5$, $0 \leq b \leq 0.4$) and a concentration-gradient layer, where the concentrations of Ni, Co and Mn are gradually changed from the core layer to the shell layer.

The present invention is characterized by using a batch reactor to prepare the precursor for a lithium secondary battery and the positive electrode active material.

A schematic diagram of the batch reactor used for preparing the positive electrode active material for a lithium secondary battery of the present invention is shown in FIG. 1. In the batch reactor, a part of a reactant is fed into the reactor in advance for the purpose of adjusting heat of the reaction and the concentration of reactants, and then stirring and the reaction are conducted as adding other ingredients thereto. The batch reactor according to the present invention has a raw material inlet, which can supply a raw material continuously as the reaction progresses, and collects a product at once after the reaction is completed.

In case of the batch reactor used in the present invention, uniform product without variation can be prepared economically because reaction conditions of all reactants in the reactor such as concentration, temperature and residence time are same.

A precipitate forming a concentration-gradient layer, where particle size is uniform and metal elements are uniformly distributed, can be obtained by the co-precipitation method, as the method for preparing the positive electrode active material of the present invention, comprising: first, supplying a predetermined amount of a chelating agent aqueous solution into a batch reactor; and then, as the reaction progresses, supplying a precursor aqueous solution, a chelating agent and a basic aqueous solution continuously into the reactor, respectively, while adjusting the concentration in the reactor differently.

Advantageous Effects of the Invention

According to the method of the present invention for preparing a positive electrode active material precursor and a positive electrode active material for a lithium secondary battery having a concentration-gradient layer using a batch reactor, as the reaction progresses in the batch reactor, a concentration-gradient layer between a core layer and a shell layer can be formed in the batch reactor in a stable and economically advantageous manner by adjusting the concentrations of a precursor aqueous solution and a chelating agent. And therefore, the prepared positive electrode active material precursor and the positive electrode active material have high capacity and tapped density as well as elongated lifespan and improved thermal stability.

BRIEF DESCRIPTION OF DRAWINGS

The above and other objects and features of the present invention will become apparent from the following description of the invention taken in conjunction with the following accompanying drawings, which respectively show.

DETAILED DESCRIPTION OF THE INVENTION

Figure 1:
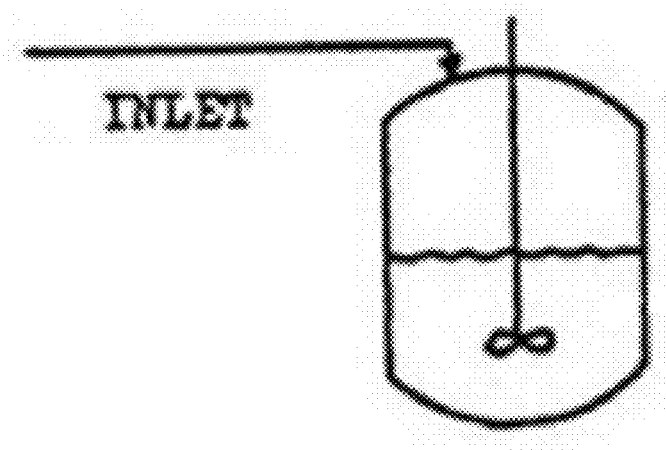
FIG. 1: a schematic diagram of the batch reactor used to the method for preparing the positive electrode active material for a lithium secondary battery of Example of the present invention.

Hereinafter, the method of the present invention for preparing the positive electrode active material precursor and the positive electrode active material for a lithium secondary battery will be described in detail First of all, in the step 1), 2 to 3 mol/L of a chelating agent aqueous solution is supplied into a reactor up to 25~35% of the total reactor volume.

The chelating agent may form a complex by reacting with a precursor aqueous solution supplied into the reactor in the following step, and as the chelating agent, ammonia aqueous solution, sulfuric acid aqueous solution, and a mixture thereof may be used.

In the step 1), before supplying the precursor aqueous solution as a reacting solution, the 2 to 3 mol/L of chelating agent aqueous solution is supplied into the reactor up to 25~35% of the total reactor volume.

The chelating agent may form a complex by reacting with the precursor aqueous solution supplied into the reactor in the following step. However, if the chelating agent aqueous solution is excessively added, the formed complex may react again with a basic aqueous solution, and the remained chelating agent is changed into an intermediate and may be used as a chelating agent. However, the amount of the core produced in this case may be insufficient, and it may be resulted to reduction of the amount of the precursor prepared by one cycle operation of the batch reactor. If the chelating agent aqueous solution is less added, the amount of the core produced may be low, and it may be resulted to reduction of the yield in the reactor. Therefore, it is preferred to supply the 2 to 3 mol/L chelating agent aqueous solution into the reactor up to 25~35% of the total reactor volume.

Then, in the step 2), each of a first precursor aqueous solution (wherein, Ni:Co:Mn=a:b:1−(a+b) (0.7≤a≤0.9, 0≤b≤0.2)), the chelating agent aqueous solution and the basic solution is simultaneously supplied into the reactor continuously as mixing thereof in the reactor at the same time to form a core layer.

The step 2) will be described in more detail as follows. According to the co-precipitation method, first, metal salts of Ni, Co and Mn are dissolved in distilled water to the ratio of a:b:1−(a+b) (0.7≤a≤0.9, 0≤b≤0.2) to prepare the first precursor aqueous solution. The co-precipitation method is a method to obtain a composite hydroxide by precipitating two or more elements in an aqueous solution using neutralization reaction at the same time. As the metal salts, sulfate, nitrate, acetate, halide, hydroxide and the like may be used, and it is not particularly limited if it can be sufficiently dissolved in water.

Each of the first precursor aqueous solution, the chelating agent aqueous solution and the basic solution is simultaneously supplied into the batch reactor continuously to obtain a precipitate. At this time, the molar concentration ratio of the metal salts in the first precursor aqueous solution to the chelating agent in the chelating agent aqueous solution should be 0.1 to 0.5, preferably, to control the production of new core and the growth of the produced core. As the chelating agent, an aqueous solution of the same concentration with the concentration used in the step 1) may be used, and the molar concentration ratio of the metal salts in the first precursor aqueous solution to the chelating agent in the chelating agent aqueous solution should be 0.1 to 0.5 by adjusting the amount supplied.

Considering the thickness of the core unit for giving high capacity, each of the first precursor aqueous solution, the chelating agent aqueous solution and the basic aqueous solution may be simultaneously supplied into the reactor up to 30~60% of the total reactor volume to obtain a spherical precipitate forming the core unit, preferably. The inflow speed is not particularly limited, but the inflow speed may be adjusted to make the residence time of the reactants in the reactor 5 to 20 hours, and the temperature in the reactor may be maintained at 40 to 80° C. and at pH of 10 to 13, preferably.

In the method of the present invention, the concentration of the chelating agent in the batch reactor is reduced during the core layer forming reaction of the step 2). In the co-precipitation method, the chelating agent plays a role of forming new core, but when the batch reactor according to the present invention is used, the reaction for forming the new core should be inhibited after a predetermined reaction time passed from supplying the raw material to increase the yield in the reactor and enhance the uniformity of the prepared particles.

The method reducing the concentration of the chelating agent in the reactor may be: reducing the concentration gradually during the process of the step 2); or reducing the concentration stepwise, namely, changing the inflow speed or concentration to reduce the concentration of the chelating agent in the reactor after a predetermined time passed from using the chelating agent at a predetermined concentration, but not limited thereto. Specifically, in one embodiment of the present invention, the speed of supplying the chelating agent is reduced to gradually decrease the concentration of the chelating agent in the reactor.

As the basic aqueous solution, NaOH aqueous solution, KOH aqueous solution or a mixture thereof may be used preferably. In the method of the present invention, the concentration of the basic aqueous solutions used in the steps of 1) to 4) may be same, and the amount supplied may be adjusted according to the needed pH condition for synthesis in each step.

After obtaining the precursor hydroxide forming the core layer as described above, as the step 3), the second precursor aqueous solution, chelating agent aqueous solution and the basic aqueous solution may be supplied into the reactor continuously up to 10 to 30% of the total reactor volume under the same condition to form a concentration-gradient layer on the surface of the core layer. The molar concentration ratio of the metal salts in the second precursor aqueous solution to the chelating agent in the chelating agent aqueous solution may be 0.2 to 0.4.

An aqueous solution for forming a concentration-gradient layer is prepared in advance, and then, the second precursor aqueous solution is prepared by mixing the aqueous solution for forming a concentration-gradient layer with the first precursor aqueous solution in a separate agitator at a predetermined ratio. Then, the resulting mixture solution is supplied into the batch reactor continuously at the same time.

The aqueous solution for forming the concentration-gradient layer is prepared by dissolving metal salts, Ni, Co and Mn, into distilled water to Ni:Co:Mn=a:b:1−(a+b) ($0 \leq a \leq 0.2$, $0.1 \leq b \leq 0.4$), and mixed to the first precursor aqueous solution until the concentration of the first precursor aqueous solution becomes the desired concentration of the shell layer, i.e., Ni:Co:Mn=a:b:1−(a+b) ($0 \leq a \leq 0.5$, $0 \leq b \leq 0.4$).

In the present invention, the aqueous solution for forming a concentration-gradient layer is gradually mixed to the first precursor aqueous solution forming the core layer to obtain the second precursor aqueous solution, and the concentrations of Ni, Mn and Co metal ions in the second precursor aqueous solution is gradually changed while continuously supplying thereof in the batch reactor at the same time. Therefore, the concentration-gradient layer can be produced more stably.

The second precursor aqueous solution may be supplied into the reactor up to 10 to 30% of the total reactor volume in consideration of the thickness of the concentration-gradient layer for high capacity and stability of the produced precursor, preferably. If the thickness of the concentration-gradient layer is low, the concentration from the core to the shell is rapidly changed. In case of the present invention, as described above, because the second precursor aqueous solution forming the concentration-gradient layer is prepared by mixing the first precursor aqueous solution and the aqueous solution for forming a concentration-gradient layer at a predetermined ratio and simultaneously supplied into the batch reactor continuously, the stability of the produced precursor is not affected by the rapid concentration-gradient of the thin concentration-gradient layer.

After forming the concentration-gradient layer as described above, in the step 4), a third precursor aqueous solution may be supplied into the batch reactor to form a shell layer.

The shell layer contains Ni, Co and Mn at the ratio of a:b:1−(a+b) ($0 \leq a \leq 0.5$, $0 \leq b \leq 0.4$), and has higher stability due to its high Mn content. The third precursor aqueous solution for forming the shell layer may be an aqueous solution of the mixture resulted from mixing the second precursor aqueous solution and the aqueous solution for forming a concentration-gradient layer in the step 3), or a separate aqueous solution prepared at the said concentration may be used.

The amount and the speed of supplying the chelating agent may be adjusted to make the molar concentration ratio of the metal salts in the third precursor aqueous solution to the chelating agent in the chelating ageant aqueous solution for forming the shell layer 0.05 to 0.2. If the thickness of the shell layer is 5% or less, compared with the entire precursor, the thermal stability may be reduced. Therefore, considering the thermal stability of the precursor, the third precursor aqueous solution, the chelating agent aqueous solution and the basic aqueous solution may be simultaneously supplied into the batch reactor continuously up to 5~10% of the total reactor volume to precipitate the shell layer.

In the step 5) of the present invention, the hydroxide or oxide precursor precipitate comprising the prepared core layer, the concentration-gradient layer and the shell layer prepared as described above may be dried or heat-treated to prepare the positive electrode active material precursor for a lithium secondary battery.

The drying process may be conducted at 110 to 150° C. for 10 to 20 hours, preferably, 15 to 20 hours. If the process is conducted within the said range, the moisture contained in the precipitate may be removed fully.

The heat-treating process may be conducted at 400 to 650° C., preferably, 400 to 600° C., more preferably, 400 to 550° C. for 5 to 10 hours. Further, the heat-treating process may comprise: first, sintering by maintaining at 400 to 650° C. for 5 to 10 hours; second, sintering at 700 to 1100° C. for 10 to 30 hours; and annealing at 700° C. for 5 to 10 hours. Before conducting the drying process, a washing process with distilled water may be further conducted.

Further, using the positive electrode active material precursor having the concentration-gradient layer prepared as described above, the present invention provides a positive electrode active material comprising: the core layer showing high capacity due to high Ni content; the shell layer showing high stability due to high Mn content; and the concentration-gradient layer, where the concentrations of Ni, Co and Mn are gradually changed, between the core layer and the shell layer, and a lithium secondary battery and other electrochemical device comprising the positive electrode active material.

The positive electrode active material may be obtained by mixing the positive electrode active material precursor having the prepared concentration-gradient layer with a lithium compound followed by heat-treating thereof.

The method mixing the positive electrode active material precursor and the lithium compound is not limited, and a dry method mixing the positive electrode active material precursor having the concentration-gradient layer and the lithium compound in a solid state sufficiently, or a wet method mixing positive electrode active material precursor having the concentration-gradient layer and the lithium compound into an aqueous solution mixed with a chelating agent such as citric acid, tartaric acid, glycolic acid and maleic acid may be used.

Finally, the resulting mixture was sintered at 750 to 1000° C. under oxidative atmosphere containing air or oxygen for 10 to 25 hours to prepare a positive electrode active material for a lithium secondary battery having a concentration-gradient layer.

The positive electrode active material for a lithium secondary battery comprises a core layer of $Li_{1+\delta}[Ni_aCo_bMn_{1-(a+b)}]O_2$ (wherein, $0 \leq \delta \leq 0.2$, $0.7 \leq a \leq 0.9$, $0 \leq b \leq 0.2$), a shell layer of $Li_{1+\delta}[Ni_aCo_bMn_{1-(a+b)}]O_2$ (wherein, $0 \leq \delta \leq 0.2$, $0 \leq a \leq 0.5$, $0 \leq b \leq 0.4$), and a concentration-gradient layer, where the concentrations of Ni, Co and Mn are gradually changed, between the core layer and the shell layer.

Specific surface area of the positive electrode active material for a lithium secondary battery according to the present invention having the concentration-gradient layer prepared by the method using a batch reactor was 0.6~0.7 $m^2/g$, and tapped density of the precursor was 1.5 to 2.0.

Further, the present invention provides a lithium secondary battery using the positive electrode active material for a lithium secondary battery having the concentration-gradient layer.

The electrolyte, which can be used for the lithium secondary battery using the positive electrode active material for a lithium secondary battery having the concentration-gradient layer prepared by the method according to the present invention, may be ester, for example cyclic carbonate such as ethylene carbonate (EC), propylene carbonate (PC), butylene carbonate (BC) and vinylene carbonate (VC); acyclic carbonate such as dimethyl carbonate (DMC), diethyl carbonate (DEC), ethyl methyl carbonate (EMC) and dipropyl carbonate (DPC); aliphatic carboxylic ester such as methyl formate (MF), methyl acetate (MA), methyl propionate (MP) and ethyl propionate (MA); and cyclic carboxylic ester such as butyrolactone (GBL). Preferably, the cyclic carbonate may be EC, PC, VC and the like. Further, occasionally, the aliphatic carboxylic ester may be used in the range of 20% or less.

The lithium salt dissolved in the solvent may be $LiClO_4$, $LiBF_4$, $LiPF_6$, $LiAlCl_4$, $LiSbF_6$, $LiSCN$, $LiCF_3SO_3$, $LiCF_3CO_2$, $Li(CF_3SO_2)_2$, $LiAsF_6$, $LiN(CF_3SO_2)_2$, $LiB_{10}Cl_{10}$, LiBOB (Lithium Bis(oxalato)borate), LiBoB, low aliphatic carboxylic acid lithium salt, chloroborate lithium salt, tetraphenylborate lithium, and imides such as $LiN(CF_3SO_2)(C_2F_5SO_2)$, $LiN(CF_3SO_2)_2$, $LiN(C_2F_5SO_2)_2$ and $LiN(C_2F_5SO_2)(C_4F_9SO_2)$.

The lithium salt may be used alone or in combination within a range that does not impair the effects of the present invention. $LiPF_6$ may be particularly preferred.

Further, in order to make the electrolyte nonflammable, carbon tetrachloride, trifluoroethylene chloride or phosphate containing phosphorus may be added to the electrolyte.

In addition, the following solid electrolyte may be used. As an inorganic solid electrolyte, $Li_4SiO_4$, $Li_4SiO_4$-LiI-LiOH, $XLi_3PO_4$-$(1-x)Li_4SiO_4$, $Li_2SiS_3$, $Li_3PO_4$—$Li_2S$—$SiS_2$, phosphorus sulfide and the like may be used preferably.

As an organic solid electrolyte, polymer materials such as polyethylene oxide, polypropylene oxide, polyvinyl alcohol, polyfluorovinylidene, fluoropropylene and the like, derivatives thereof, mixture thereof, complex thereof, and the like may be used preferably.

As the separator, polyethylene-based polymer such as porous polyethylene or polypropylene-based polymer may be used preferably.

As the negative electrode material used in the present invention, a compound, which can adsorb or release lithium ion, such as lithium, lithium alloy, alloy, intermetallic compound, carbon, organic compound, inorganic compound, metal complex and organic polymer compound may be used. The compound may be used alone or in combination within a range that does not impair the effects of the present invention.

As the lithium alloy, Li—Al-based alloy, Li—Al—Mn-based alloy, Li—Al—Mg-based alloy, Li—Al—Sn-based alloy, Li—Al—In-based alloy, Li—Al—Cd-based alloy, Li—Al—Te-based alloy, Li—Ga-based alloy, Li—Cd-based alloy, Li—In-based alloy, Li—Pb-based alloy, Li—Bi-based alloy and Li—Mg-based alloy may be used preferably.

As the alloy or the intermetallic compound, a compound of transition metal and Si, a compound of transition metal and Sn and the like may be used, and particularly, a compound of Ni and Si is preferred. As the carbon material, coke, pyrolytic carbons, natural graphite, artificial graphite, meso-carbon micro beads, graphitized meso-phase) sphere, vapor grown carbons, glass-like carbons, carbon fibers (poly acrylonitrile-based, pitch-based, cellulose-based, vapor grown carbon-based), amorphous carbon and carbon calcinating organic material may be used preferably. These may be used alone or in combination within a range that does not impair the effects of the present invention.

Further, as the cladding, a metal can or a packaging material consisting of aluminum and multi-layered polymer layer may be used preferably.

Hereinafter, the present invention is explained by the following examples in more detail. The following examples are intended to further illustrate the present invention, and the scope of the present invention cannot be limited thereby in any way.

EXAMPLE

Distilled water 20 L and ammonia as a chelating agent 840 g were fed into a batch reactor (capacity: 70 L, ouput of a rotating motor: 80 W or more), and the mixture was stirred using a motor at 400 rpm as maintaining the temperature in the reactor at 50° C.

Then, as the second step, a 2.5M first precursor aqueous solution (nickel sulfate: cobalt sulfate:manganese sulfate (molar ratio)=8:1:1) and an 28% ammonia aqueous solution were continuously supplied into the reactor at the rate of 2.2 L/hour and 0.15 L/hour, respectively. Further, for adjusting pH, 25% sodium hydroxide aqueous solution was supplied thereinto to maintain pH at 11. Impeller speed was controlled at 400 rpm. The prepared first precursor aqueous solution, ammonia solution and sodium hydroxide solution were supplied into the reactor continuously up to 27 L.

Then, as the third step, an 2.5M aqueous solution for forming a concentration-gradient layer (nickel sulfate:cobalt sulfate:manganese sulfate (molar ratio)=1:1:8) was prepared, and mixed with the 2.5M first precursor aqueous solution (nickel sulfate:cobalt sulfate:manganese sulfate (molar ratio)=8:1:1) prepared in the step 2) in a separate agitator besides the batch reactor by adding the first precursor aqueous solution at 2.2 L/hour and stirring thereof after fixing the capacity of the first precursor aqueous solution at 10 L to prepare the second precursor aqueous solution. The prepared solution was supplied into the batch reactor at the same time. Until the molar ratio of nickel sulfate, cobalt sulfate and manganese sulfate in the second precursor aqueous solution became 4:1:5 as the concentration of the shell layer, the aqueous solution for forming a concentration-gradient layer was mixed thereto and supplied in the batch reactor at the same time. The 28% ammonia aqueous solution was fed at 0.08 L/hour, and the pH of the sodium hydroxide solution was maintained at 11. At this time, the supplied volume of the second precursor aqueous solution and the ammonia aqueous solution and the sodium hydroxide solution was 17 L.

Then, as the fourth step, the third precursor aqueous solution (nickel sulfate:cobalt sulfate:manganese sulfate (molar ratio)=4:1:5) was supplied into the batch reactor up to 5 L, and after the reaction was completed, a spherical Ni—Mn—Co composite hydroxide precipitate was obtained from the batch reactor.

The precipitated composite metal hydroxide was filtered, washed with water and dried in a 110° C. hot air dryer for 12 hours to obtain a composite metal hydroxide type precursor powder having continuous concentration-gradient, wherein the concentration of the internal core layer is $(Ni_{0.8}Co_{0.1}Mn_{0.1})(OH)_2$ and the concentration of the external shell layer is from $(Ni_{0.8}Co_{0.1}Mn_{0.1})(OH)_2$ to $(Ni_{0.4}Co_{0.1}Mn_{0.5})(OH)_2$.

The composite metal hydroxide and lithium hydroxide (LiOH) were mixed to the molar ratio of 1:1.03, heated at the rate of 2° C./min and annealed at 550° C. for 10 hours followed by calcinating at 750° C. for 20 hours to obtain a positive electrode active material powder having continuous concentration-gradient, wherein the concentration of the internal core layer is $Li(Ni_{0.8}Co_{0.1}Mn_{0.1})O_2$ and the concentration of the external shell layer is from $Li(Ni_{0.8}Co_{0.1}Mn_{0.1})O_2$ to $Li(Ni_{0.4}Co_{0.1}Mn_{0.5})O_2$.

Comparative Example

Distilled water 70 L was fed into a co-precipitation reactor as a CSTR (capacity: 70 L, power of a rotating motor: 80 W or more), and stirred using a motor at 400 rpm as maintaining the temperature in the reactor at 50° C.

Then, a 2.5M metal aqueous solution (nickel sulfate: cobalt sulfate:manganese sulfate (molar ratio)=8:1:1) was supplied into the reactor at the rate of 6.9 L/hour so as to make average residence time 6 hours, and an 28% ammonia aqueous solution was supplied into the reactor at the rate of 0.48 L/hour continuously. Further, for adjusting pH, 25% sodium hydroxide aqueous solution was supplied thereinto to maintain pH at 11.

At the point when the particle size of the composite metal hydroxide obtained above becomes 8~13 µm, the feeding amount of the ammonia was reduced to 0.24 L/hour, and an aqueous solution (nickel sulfate:cobalt sulfate:manganese sulfate (molar ratio)=39:10:51) was added to the 2.5M aqueous solution for forming a concentration-gradient layer (nickel sulfate:cobalt sulfate:manganese sulfate (molar ratio)=8:1:1) 10 L at 6.9 L/hour until the molar ratio of nickel sulfate, cobalt sulfate and manganese sulfate became 4:1:5 while stirring thereof followed by supplying thereof into the reactor.

When the molar ratio of nickel sulfate, cobalt sulfate and manganese sulfate in the metal aqueous solution became 4:1:5 in the mixture solution, the obtained solution was supplied into the reactor while maintaining the molar ratio, and the reaction was continued until reached to steady state to obtain a spherical Ni—Mn—Co composite hydroxide. Namely, the composite hydroxide was a composite metal hydroxide having continuous concentration-gradient, wherein the concentration of the internal core layer is $(Ni_{0.8}Co_{0.1}Mn_{0.1})(OH)_2$ and the concentration of the external shell layer is from $(Ni_{0.8}Co_{0.1}Mn_{0.1})(OH)_2$ to $(Ni_{0.4}Co_{0.1}Mn_{0.5})(OH)_2$.

Test Example 1

The following experiments were conducted for the precursor particle prepared in Example and Comparative Example.

1. XRD Pattern Analysis

Figure 2:
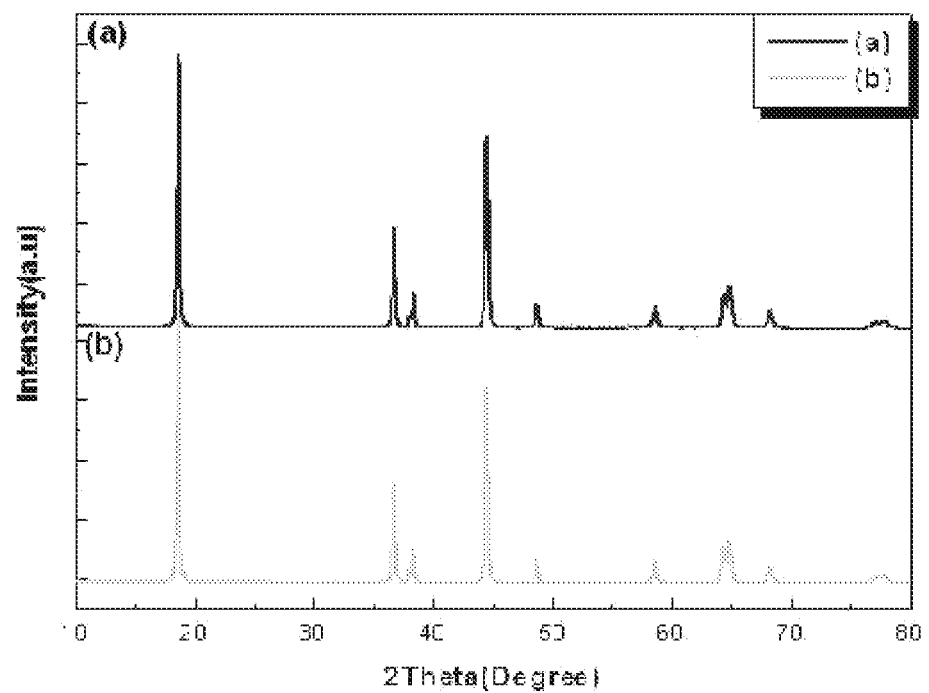
FIG. 2: X-ray patterns (XRD) of the positive electrode active material powder prepared according to (a) Example and (b) Comparative Example.

FIG. 2 is an X-ray patterns of the sintered powder obtained after sintering the precursor powder of Example and Comparative Example. As shown in FIG. 2, separation of the peaks (006) and (102), and separation of the peaks (018) and (110) were well expressed. The fact that the peak ratio of the peaks (003) and (104) is 1 or more means that the composite lithium oxide has a hexagonal-$NaFeO_2$ structure having space group of R-3m and a concentration-gradient layer, and is a lamellar compound having excellent crystallinity even after formed.

2. SEM Image Analysis

Figure 3:
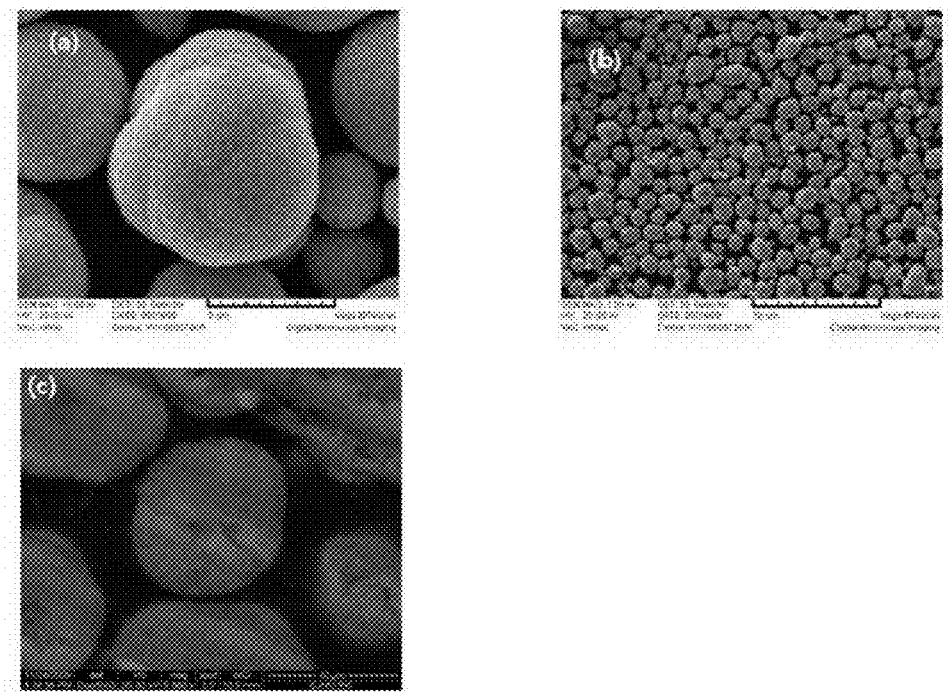
FIG. 3: (a) FE-SEM (×1,000) image of the precursor powder prepared according to Example, (b) FE-SEM (×10,000) image of the precursor powder prepared according to Example and (c) FE-SEM (×5,000) image of the precursor powder prepared according to Example.
Figure 4:
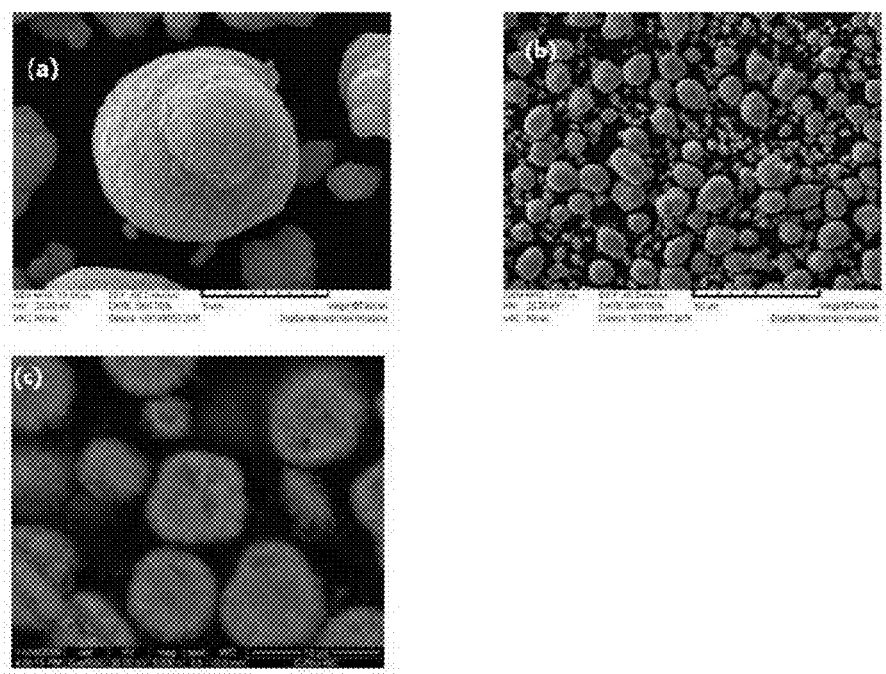
FIG. 4: (a) FE-SEM (×1,000) image of the precursor powder prepared according to Comparative Example, (b) FE-SEM (×10,000) image of the precursor powder prepared according to Comparative Example and (c) FE-SEM (×5,000) image of the precursor powder prepared according to Comparative Example.

FIGS. 3a and 3b are FE-SEM (×1,000 and ×10,000) images of the precursor prepared by drying the precipitate of Example in a 150° C. hot air dryer for 12 hours; FIG. 3c is a FE-SEM (×5,000) image of the section of the powder prepared by impregnating the precursor of Example in a resin followed by pulverizing thereof; FIGS. 4a and 4b are FE-SEM (×1,000 and ×10,000) images of the precursor prepared by drying the precipitate of Comparative Example in the 150° C. hot air dryer for 12 hours; and FIG. 4c is a FE-SEM (×5,000) image of the section of the powder prepared by impregnating the precursor of Comparative Example in a resin followed by pulverizing thereof.

As shown in FIGS. 3a and 3b, the form of the precursor prepared according to the present invention was spherical like the precursor prepared in the conventional CSTR (FIGS. 4a and 4b), and the precursor maintained the spherical particle shape after sintered at high temperature. Further, as shown in FIG. 3c, the material having different phase with the internal material of the particle was formed on the outer face of the particle. Namely, the concentration-gradient layer was formed inside the particle.

3. Particle Size Distribution Analysis

Figure 5:
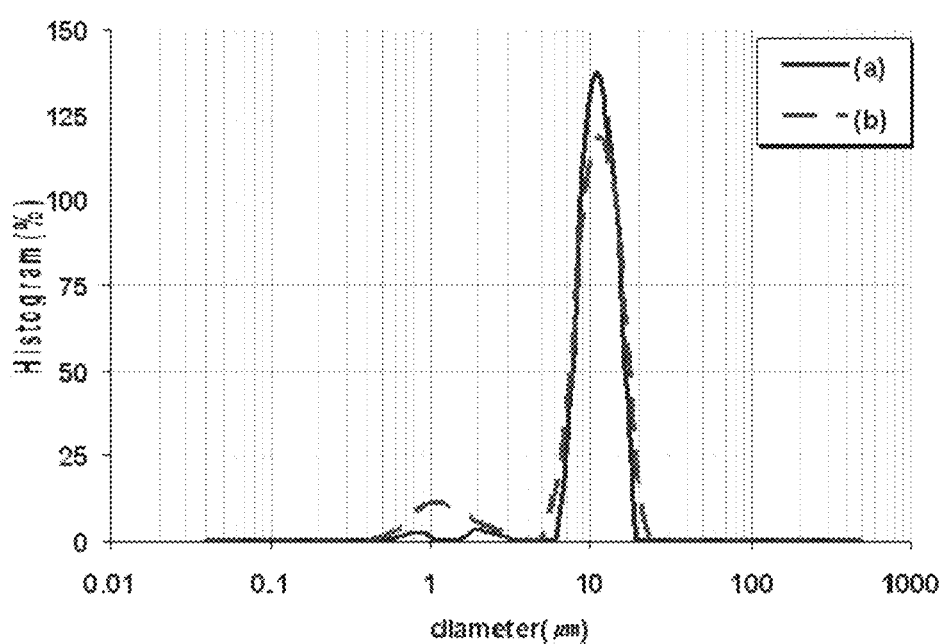
FIG. 5: particle size distribution data of the precursor powder prepared according to (a) Example and (b) Comparative Example.

FIG. 5 shows the particle size distribution of the precursor powder prepared according to Example and Comparative Example. The precursor powder prepared according to Example had the average particle diameter of 5-10 μm and spherical shape, and as shown in FIG. 5, the precursor powder prepared according to the present invention showed better particle size distribution. The tapped density of the precursor powder prepared according to the present invention was 1.7 to 2.0 g/cm$^3$.

4. EDX Analysis

Figure 6:
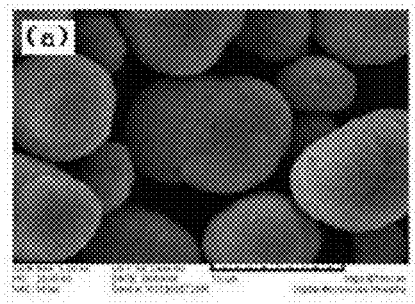
FIG. 6: EDX images and the result of the precursor powder prepared according to (a) Example and (b) Comparative Examples.
Figure 6:
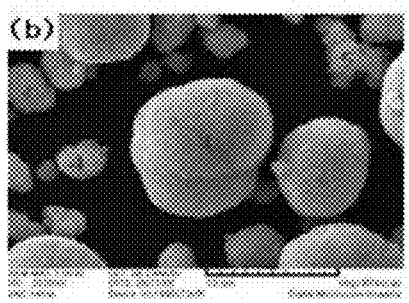

The surfaces of the precursor powder prepared in Example and Comparative Example was analyzed using an EDX (Energy Dispersive X-ray spectrometer), and the result is shown in FIG. 6.

As shown in FIG. 6, in the compound prepared according to Example of the present invention, variation of the contents of Ni, Co and Mn (manganese) detected from each particle was very low. However, the uniformity of the particle produced was low because variation of the contents of Ni, Co and Mn detected from each particle was very high (Ni: from 40.5 to 64.5 and Mn: from 24.7 to 49) in the compound prepared according to Comparative Example.

Preparation of Lithium Secondary Battery

Each positive electrode active material for a lithium secondary battery having the concentration-gradient layer prepared in Example and Comparative Example, acetylene black as a conducting material, and polyvinylidene fluoride (PVdF, product name: solef6020) as a binder were mixed to the weight ratio of 84:8:8 to prepare a slurry. The slurry was uniformly coated on an aluminum foil having the thickness of 20 μm, and vacuum dried at 130° C. to prepared a positive electrode of a lithium secondary battery.

A coin battery was prepared by a traditional method using the positive electrode, a lithium foil as a counter electrode, a porous polyethylene membrane having the thickness of 25 μm as a separator and an 1 M electrolyte prepared by dissolving LiPF$_6$ in a mixture of ethylene carbonate and ethyl methyl carbonate (3:7 volume ratio).

Test Example 2

Battery characteristics of the coin batteries prepared by using the positive electrode active materials of Example and Comparative Example were evaluated as follows.

1. Battery Capacity Analysis

Figure 7:
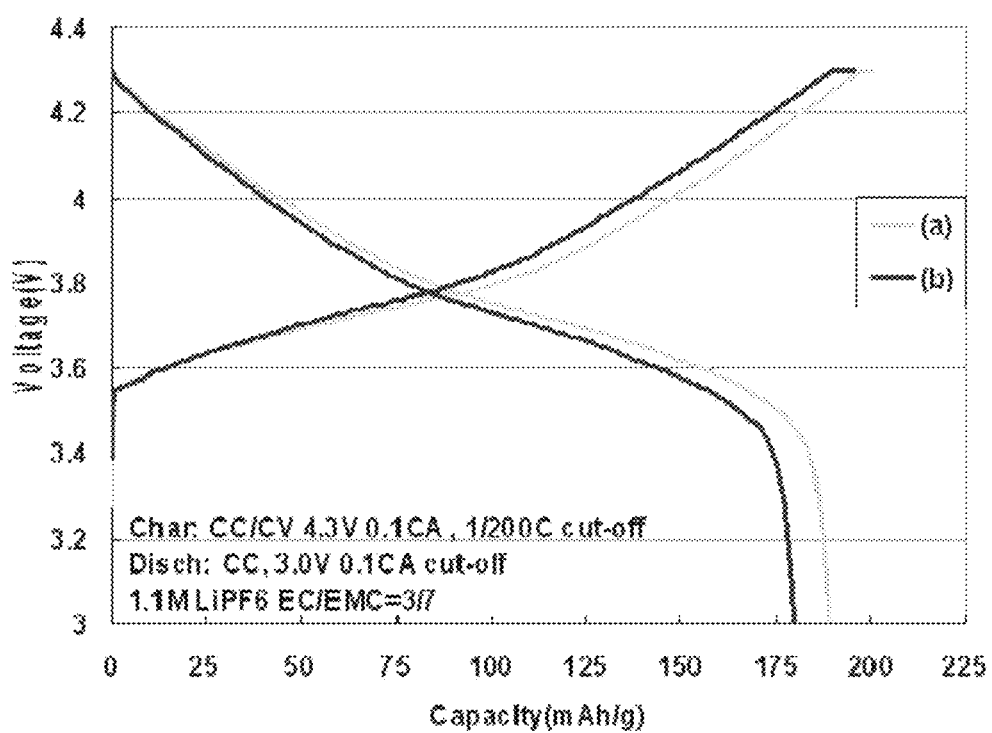
FIG. 7: a graph showing the discharge capacity resulting from charging and discharging the batteries comprising the positive electrode active material powder prepared according to (a) Example and (b) Comparative Example at 3.0 to 4.3 V to 0.1 C.

In the lithium secondary batteries prepared by using the precursor powder prepared in (a) Example and (b) Comparative Example, characteristics of the positive electrode active material was evaluated in the range from 3.0 to 4.3 V using a device for electrochemical analysis (Toyo System, Toscat 3100U). The battery capacity was measured after charging or discharging at 0.170 mA, and the result is shown in FIG. 7. As shown in FIG. 7, the discharge capacity of the sintered powder prepared in Example was 189 Ah/g, and it is higher than the average discharge capacity of commercialized LiCoO$_2$, 160 mAh/g.

2. Battery Lifespan Analysis

Figure 8:
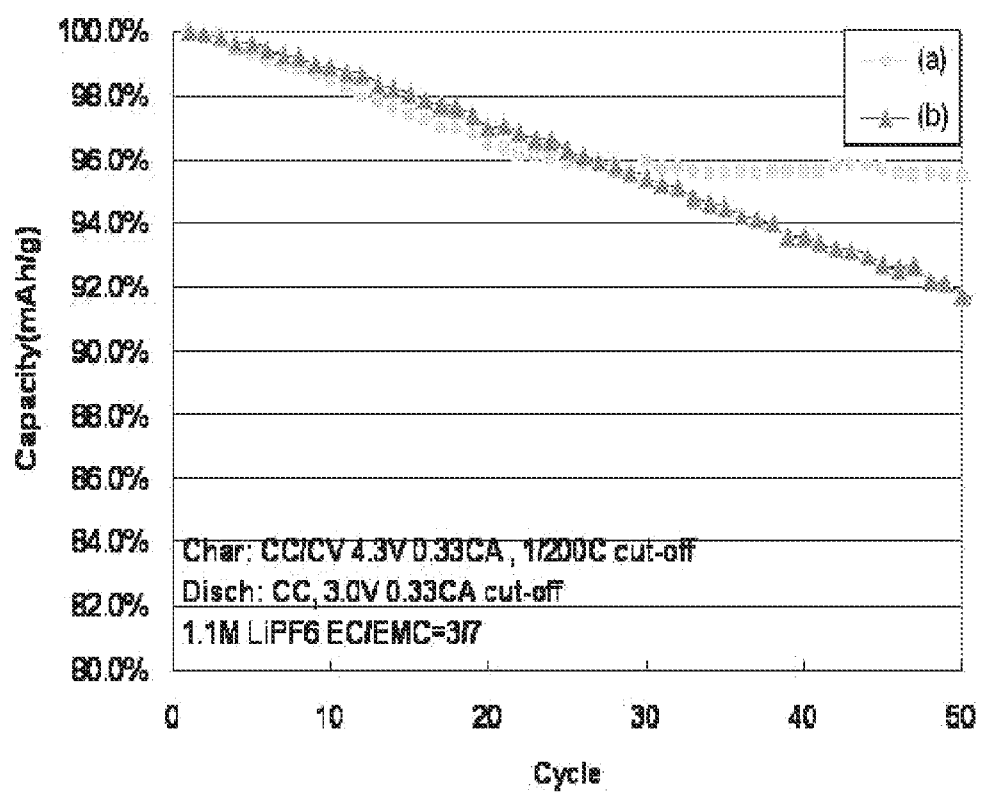
FIG. 8: a graph showing cycle characteristic resulting from charging and discharging the batteries comprising the positive electrode active material powder prepared according to (a) Example and (b) Comparative Example at 3.0 to 4.3 V to 0.1 C.

Discharge capacity retention rate (%) was measured while charging and discharging the lithium secondary batteries prepared by using the precursor powder prepared in (a) Example and (b) Comparative Example 50 times at 0.6 mAh/g in the range from 3.0 to 4.3 V, and the result is shown in FIG. 8. As shown in FIG. 8, the lithium secondary battery using the tri-layer positive electrode active material prepared in Example showed very high discharge capacity retention rate of almost 95% even after charged and discharged 50 times.

On the other hand, in the lithium secondary battery using the positive electrode active material prepared in Comparative Example, the discharge capacity retention rate was gradually reduced according to the cycle number, and it became less than 91% after charged and discharged 50 times.

3. Thermal Stability Analysis

The lithium secondary batteries using (a) the sintered powder prepared in Example and (b) the sintered powder prepared in Comparative Example as a positive electrode active material were charged at 4.3 V. Then, Differential scanning calorimetry (DSC) was performed using TA instrument Q20, and the result is shown in FIG. 9

Figure 9:
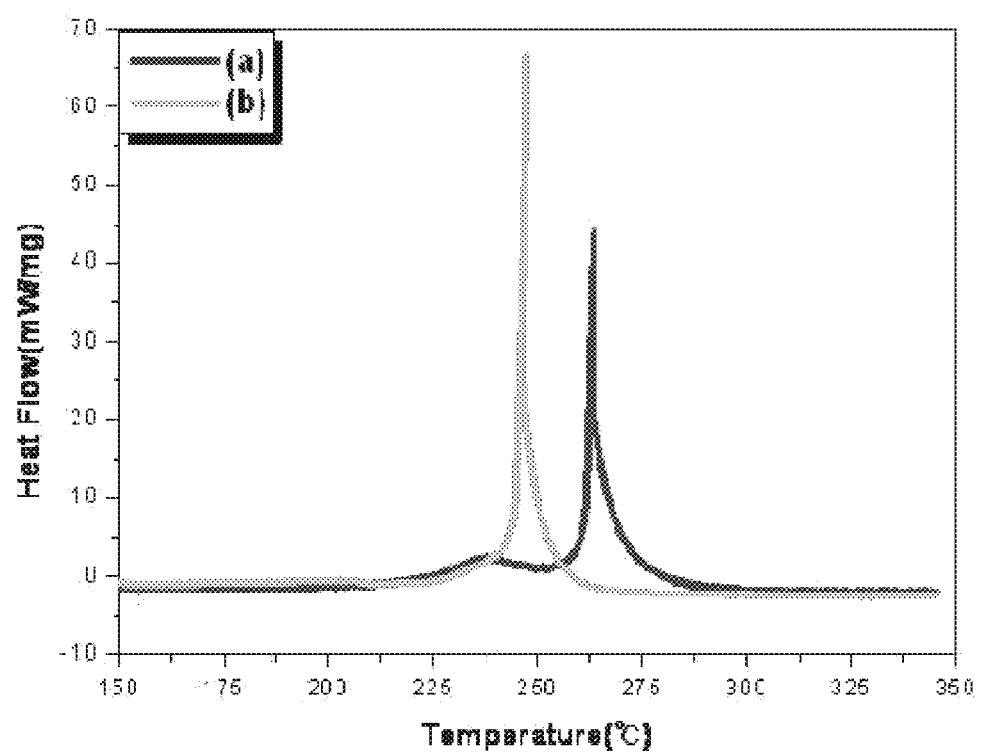
FIG. 9: a graph showing Differential scanning calorimetry (DSC) data of the positive electrode active material obtained after fully charging the batteries comprising the positive electrode active material powder prepared according to (a) Example and (b) Comparative Example at 4.3 V.

As shown in FIG. 9, in case of Comparative Example, the exothermic peak started to appear at 250° C., and the major exothermic peak appeared around 258° C. However, in case of the sintered powder forming a tri-layer prepared in Example, the exothermic peak started to appear at about 267° C., and the major exothermic peak appeared around 275° C. The precursor prepared according to the present invention showed the improvement of the thermal stability of about 20° C., compared with Comparative Example. Further, the calorific value in Example was reduced to 60%, compared with Comparative Example.

Yield Analysis

Figure 10:
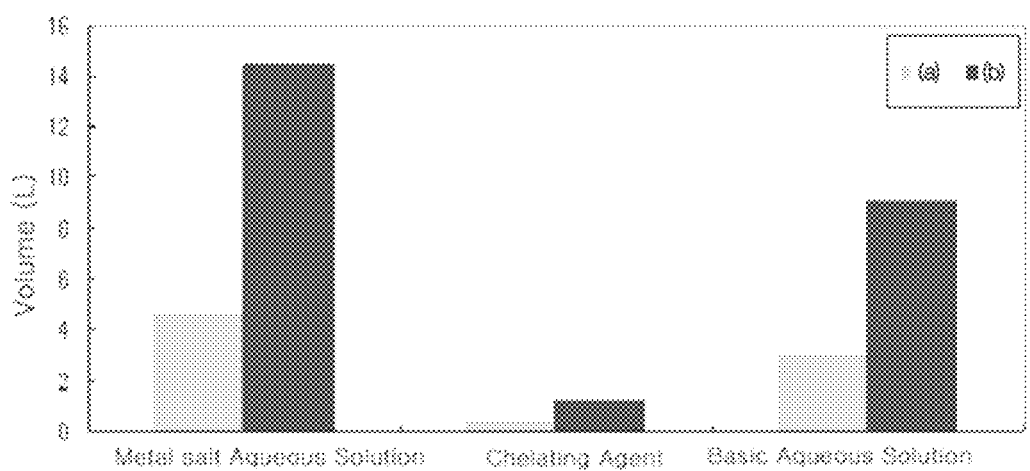
FIG. 10: a graph showing the amounts (L) of the raw material used per unit weight (kg) of the precursors prepared according to (a) Example and (b) Comparative Example.

Amount of each raw material of Example and Comparative Example, which is dried under the same condition, used for producing precursor 1 kg was measured, and the result is shown in FIG. 10 and Table 1. As shown in FIG. 10 and Table 1, When using the batch reactor of the present invention, the amount of the raw material used for producing the precursor 1 kg was only 33%, compared with Comparative Example using the CSTR, and therefore, there was 67% raw material-reducing effect.

TABLE 1

| | | Amount used of raw material (L) | | |
|---|---|---|---|---|
| Process type | One batch precursor yield | Metal salt aqueous solution | Ammonia | Sodium Hydroxide |
| Exam. | 1.0 kg | 4.65 | 0.40 | 2.94 |
| Comp. Exam. | 1.0 kg | 14.45 | 1.20 | 9.08 |
| Amount used of raw material (Exam./Comp. Exam.) × 100(%) | | 32% | 33% | 32% |

INDUSTRIAL APPLICABILITY

The methods of the present invention for preparing a positive electrode active material precursor and a positive electrode active material for a lithium secondary battery having a concentration-gradient layer using a batch reactor by supplying a predetermined amount of a chelating agent into the batch reactor followed by simultaneously supplying a transition metal while adjusting the concentration thereof continuously, can form the concentration-gradient layer from a core layer to a shell layer in a more economically advantageous and stable manner. And at the same time, the product may be usefully used as a positive electrode active material having elongated lifespan and improved thermal stability.

What is claimed is:

1. A method for preparing a positive electrode active material precursor for a lithium secondary battery having a concentration-gradient layer using a batch reactor, which comprises:
   1) supplying a first chelating agent aqueous solution into the batch reactor; then
   2) simultaneously supplying a first precursor aqueous solution, a second chelating agent aqueous solution and a first basic aqueous solution into the reactor continuously to obtain a spherical precipitate forming a core layer; then
   3) simultaneously supplying a second precursor aqueous solution, a third chelating agent aqueous solution and a second basic aqueous solution into the reactor continuously to obtain a precipitate forming the concentration-gradient layer, where the concentrations of nickel (Ni), manganese (Mn) and cobalt (Co) are relatively and gradually changed, on the surface of the core layer; then
   4) simultaneously supplying a third precursor aqueous solution, a fourth chelating agent aqueous solution and a third basic aqueous solution into the reactor continuously to obtain a precipitate forming a shell layer on the surface of the concentration-gradient layer; and then
   5) drying or heat-treating the precipitate to prepare a positive electrode active material precursor for a lithium secondary battery,
   wherein, in the step 1), the concentration of the first chelating agent aqueous solution is 2 to 3 mol/L, and the first chelating agent aqueous solution is supplied into the reactor to 25 to 35% of the total reactor volume, and
   wherein, in the step 2), the molar concentration ratio of the metal salts in the first precursor aqueous solution to the chelating agent in the second chelating agent aqueous solution is 0.1 to 0.5; the first precursor aqueous solution, the second chelating agent aqueous solution and the first basic aqueous solution are simultaneously supplied into the reactor continuously to 30 to 60% of the total reactor volume; the concentration of the chelating agent in the reactor is reduced as the reaction progresses, and
   wherein, in the step 3), the molar concentration ratio of the metal salts in the second precursor aqueous solution to the chelating agent in the third chelating agent aqueous solution is 0.2 to 0.4, and the second precursor aqueous solution, the third chelating agent aqueous solution and the second basic aqueous solution are simultaneously supplied into the reactor continuously up to 10 to 30% of the total reactor volume, and
   wherein, in the step 3), the second precursor aqueous solution is prepared by mixing the first precursor aqueous solution and an aqueous solution in a separate reactor for forming a concentration-gradient at a predetermined ratio, and is supplied into the reactor continuously at the same time, and
   wherein, in the step 4), the molar concentration ratio of the metal salts in the third precursor aqueous solution to the chelating agent in the fourth chelating agent aqueous solution is 0.05 to 0.2; and the third precursor aqueous solution, the fourth chelating agent aqueous solution and the third basic aqueous solution are simultaneously supplied into the reactor continuously up to 5 to 10% of the total reactor volume.

2. The method of claim 1, wherein, in step 2), a molar ratio of Ni:Co:Mn in the first precursor aqueous solution is $a:b:1-(a+b)$ ($0.7 \leq a \leq 0.9$, $0 \leq b \leq 0.2$).

3. The method of claim 1, wherein in the step 3), the molar ratio of Ni:Co:Mn in the aqueous solution for forming a concentration-gradient is $a:b:1-(a+b)$ ($0 \leq a \leq 0.2$, $0.1 \leq b \leq 0.4$).

4. The method of claim 1, wherein the second precursor aqueous solution of step 3) is prepared by mixing the first precursor aqueous solution and an aqueous solution for forming a concentration until the molar ratio of Ni:Co:Mn in the mixture becomes $a:b:1-(a+b)$ ($0 \leq a \leq 0.5$, $0 \leq b \leq 0.4$) and is supplied into the reactor continuously at the same time.

5. The method of claim 1, wherein, in the step 4), the molar ratio of Ni:Co:Mn in the third precursor aqueous solution is $a:b:1-(a+b)$ ($0 \leq a \leq 0.5$, $0 \leq b \leq 0.4$).

6. A method for preparing a positive electrode active material for a lithium secondary battery having a concentration-gradient layer using a batch reactor, which further comprises:
   1) mixing the positive electrode active material precursor for a lithium secondary battery having a concentration-gradient layer prepared according to according to claim 1 with lithium (Li) compound; and
   2) heat-treating the mixture at 750° C. to 1000° C. under oxidative atmosphere containing air or oxygen for 10 to 25 hours.

* * * * *